United States Patent
Shi (10) Patent No.: US 10,912,102 B2
(45) Date of Patent: Feb. 2, 2021

(54) METHOD AND TERMINAL DEVICE FOR MANAGING TIMER AND TRANSMITTING INFORMATION

(71) Applicant: Guangdong OPPO Mobile Telecommunications Corp., Ltd., Guangdong (CN)

(72) Inventor: Cong Shi, Dongguan (CN)

(73) Assignee: Guangdong OPPO Mobile Telecommunications Corp., Dongguan (CN)

(*) Notice: Subject to any disclaimer, the term of this patent is extended or adjusted under 35 U.S.C. 154(b) by 0 days.

(21) Appl. No.: 16/884,707

(22) Filed: May 27, 2020

(65) Prior Publication Data

US 2020/0288483 A1    Sep. 10, 2020

Related U.S. Application Data (63) Continuation of application No. PCT/CN2017/120128, filed on Dec. 29, 2017.

(51) Int. Cl.
*H04W 72/12* (2009.01)
*H04L 1/18* (2006.01)

(52) U.S. Cl.
CPC ....... *H04W 72/1205* (2013.01); *H04L 1/1812* (2013.01)

(58) Field of Classification Search
CPC .......... H04W 72/1205; H04L 1/1812
See application file for complete search history.

(56) References Cited

U.S. PATENT DOCUMENTS

| | | | | |
|---|---|---|---|---|
| 2017/0188391 A1* | 6/2017 | Rajagopal | ......... | H04W 74/0816 |
| 2017/0289733 A1* | 10/2017 | Rajagopal | ............... | H04W 4/70 |
| 2019/0053211 A1* | 2/2019 | Ying | ................... | H04W 72/044 |

FOREIGN PATENT DOCUMENTS

| | | |
|---|---|---|
| CN | 102355334 A | 2/2012 |
| CN | 102625432 A | 8/2012 |
| CN | 105122858 A | 12/2015 |
| CN | 106470399 A | 3/2017 |
| EP | 3352518 A1 | 7/2018 |
| WO | 2017047445 A1 | 7/2018 |

OTHER PUBLICATIONS

International Application No. PCT/CN2017/120128, International search report, dated Sep. 25, 2018, 2 pages.
NTT DOCOMO, Inc., "Views on SPS activation/deactivation mechanism", 3GPP TSG RAN WG1 Meeting #90bis, R1-1718173, Oct. 9-13, 2017.

(Continued)

*Primary Examiner* — Thai Nguyen
(74) *Attorney, Agent, or Firm* — Kilpatrick Townsend & Stockton LLP (57) ABSTRACT

Embodiments of the application provide a method and device for timer management in a wireless communication network. A device of the network obtains a first physical downlink control channel (PDCCH), then the device determines whether to stop, start or restart a timer, when the first PDCCH is scrambled by using a cell radio network temporary identifier (C-RNTI), wherein the timer is a semi-persistent scheduling (SPS) timer.

20 Claims, 7 Drawing Sheets

(56) References Cited

OTHER PUBLICATIONS

Ericsson, "Remaining issues on SPS UL", 3GPP TSG-RAN WG2 #99bis Tdoc R2-1711253, Tdoc R2-1711253 an update of R2-1708352, Oct. 13, 2017, Prague, CZ.
R1-162122 Huawei,HiSilicon SPS enhancement for V2V Apr. 11-15, 2016.
The extended European search report for European application 17935974.0 dated Nov. 3, 2020.
Examination report No. 1 for Australian standard patent application 2017444779 dated Nov. 20, 2020.

* cited by examiner

METHOD AND TERMINAL DEVICE FOR MANAGING TIMER AND TRANSMITTING INFORMATION

CROSS-REFERENCE TO RELATED APPLICATION

This application is a continuation of and claims priority to International Patent Application PCT/CN2017/120128, filed Dec. 29, 2017, the contents of which is hereby incorporated by reference in its entirety.

BACKGROUND OF THE INVENTION

Technical Field

Embodiments of this application relate to the communications field, and more specifically, to a data retransmission method, a terminal device, and a network device.

Related Art

In new radio (NR), a semi-persistent scheduling (SPS) timer is defined in the following ways:

1. The timer is started when retransmission data or new transmission data is sent on semi-persistent resources or dynamic resources, scheduled based on a semi-persistent radio network temporary identifier (RNTI).

2. When the timer is running, if a user has semi-persistent resources at the current time, the user does not make any transmission.

3. When the timer is running, the timer is stopped after the user receives the dynamic resources scheduled based on the semi-persistent RNTI, and the timer is restarted based on the above 1.

However, after the timer obtains dynamic resources scheduled based on a cell radio network temporary identifier (C-RNTI), there are no relevant regulations on the SPS timer, and the timer is less compatible with the existing system framework.

SUMMARY OF THE INVENTION

A timer management method, an information transmission method, a terminal device, and a network device are provided, to effectively improve compatibility between an SPS timer and the existing system framework.

According to a first aspect, a timer management method is provided, and is applied to a terminal device, the terminal device including a semi-persistent scheduling SPS timer.

The method includes determining, by the terminal device, after receiving a first physical downlink control channel PDCCH scrambled by using a cell radio network temporary identifier C-RNTI, whether to stop or start the SPS timer.

In this embodiment of this application, after receiving the first PDCCH, the terminal device causes the SPS timer to be started or stopped or restarted with dynamic resources scheduled based on the C-RNTI, thereby effectively improving compatibility between the SPS timer and the existing system framework.

In some possible implementations, the determining whether to stop or start the SPS timer includes determining, by the terminal device, when meeting a first condition, to stop the SPS timer, the first condition being a criterion for the terminal device to determine whether to stop the SPS timer after the terminal device obtains the first PDCCH.

In some possible implementations, the determining, by the terminal device, when meeting a first condition, to stop the SPS timer includes stopping, by the terminal device, when determining that a hybrid automatic repeat request HARQ process corresponding to the first PDCCH sends uplink data by using resources scheduled by a PDCCH that is scrambled by an SPS RNTI before using resources scheduled by the first PDCCH, the SPS timer.

In some possible implementations, the determining, by the terminal device, when meeting a first condition, to stop the SPS timer includes stopping, by the terminal device, when determining that a hybrid automatic repeat request HARQ process corresponding to the first PDCCH of the terminal device sends uplink data by using SPS resources before using resources scheduled by the first PDCCH, the SPS timer.

In some possible implementations, the determining, by the terminal device, when meeting a first condition, to stop the SPS timer includes stopping, by the terminal device, when determining that the SPS timer is running, the SPS timer.

In some possible implementations, the determining whether to stop or start the SPS timer includes determining, by the terminal device, when meeting a second condition, to start or restart the SPS timer, the second condition being a criterion for the terminal device to determine whether to start the SPS timer after the terminal device obtains the first PDCCH.

In some possible implementations, the determining, by the terminal device, when meeting a second condition, to start or restart the SPS timer includes starting or restarting, by the terminal device, when determining that the terminal device is configured with SPS resources, the SPS timer.

In some possible implementations, the starting or restarting, by the terminal device, when determining that the terminal device is configured with SPS resources, the SPS timer includes starting or restarting, by the terminal device, when determining that the terminal device is configured with SPS resources and the SPS resources are activated, the SPS timer.

In some possible implementations, before the determining whether to stop or start the SPS timer, the method further includes receiving, by the terminal device, configuration information sent by a network device, the configuration information being used to determine, by the terminal device, after obtaining the first PDCCH, whether to stop or start the SPS timer, where the determining whether to stop or start the SPS timer includes determining, by the terminal device, according to the configuration information, whether to stop or start the SPS timer.

In some possible implementations, the receiving, by the terminal device, configuration information sent by a network device includes receiving, by the terminal device, radio resource control RRC signaling sent by the network device, the RRC signaling including the configuration information.

In some possible implementations, before the determining whether to stop or start the SPS timer, the method further includes sending, by the terminal device, new data to the network device on the SPS resources, or retransmission data to the network device on resources scheduled by a second PDCCH that is scrambled by using an SPS radio network temporary identifier; and starting, by the terminal device, the SPS timer.

According to a second aspect, an information transmission method is provided, including sending, by a network device, a first physical downlink control channel PDCCH scrambled by using a cell radio network temporary identifier C-RNTI to a terminal device.

In some possible implementations, before the sending, by a network device, a first physical downlink control channel PDCCH scrambled by using a cell radio network temporary identifier C-RNTI to a terminal device, the method further includes sending, by the network device, configuration information to the terminal device, the configuration information being used to determine, by the terminal device, after obtaining resources indicated by the first PDCCH, whether to stop or start a semi-persistent scheduling SPS timer of the terminal device.

In some possible implementations, the sending, by the network device, configuration information to the terminal device includes sending, by the network device, radio resource control RRC signaling to the terminal device, the RRC signaling including the configuration information.

In some possible implementations, before the sending, by a network device, a first physical downlink control channel PDCCH scrambled by using a cell radio network temporary identifier C-RNTI to a terminal device, the method further includes receiving, by the network device, new data sent by the terminal device on semi-persistent scheduling SPS resources, or retransmission data sent by the terminal device, on resources scheduled by the first PDCCH that is scrambled by using an SPS radio network temporary identifier.

According to a third aspect, a terminal device is provided, the terminal device including a semi-persistent scheduling SPS timer.

The terminal device includes a transceiver unit, configured to receive a first physical downlink control channel PDCCH scrambled by using a cell radio network temporary identifier C-RNTI; and a processing unit, configured to determine whether to stop or start the SPS timer.

According to a fourth aspect, a network device is provided, including a transceiver unit, configured to send a first physical downlink control channel PDCCH scrambled by using a cell radio network temporary identifier C-RNTI to a terminal device.

According to a fifth aspect, a terminal device is provided, the terminal device including a semi-persistent scheduling SPS timer.

The terminal device includes a transceiver, configured to receive a first physical downlink control channel PDCCH scrambled by using a cell radio network temporary identifier C-RNTI; and a processor, configured to determine whether to stop or start the SPS timer.

According to a sixth aspect, a network device is provided, including a transceiver, configured to send a first physical downlink control channel PDCCH scrambled by using a cell radio network temporary identifier C-RNTI to a terminal device.

According to a seventh aspect, a computer readable medium is provided, and is configured to store a computer program. The computer program includes an instruction used to perform the method embodiment according to the first aspect or the second aspect.

According to an eighth aspect, a computer chip is provided, including an input interface, an output interface, at least one processor, and a memory. The processor is configured to execute code in the memory, and when the code is executed, the processor can implement various processes executed by the terminal device in the timer management method according to the first aspect.

According to a ninth aspect, a computer chip is provided, including an input interface, an output interface, at least one processor, and a memory. The processor is configured to execute code in the memory, and when the code is executed, the processor can implement various processes executed by the network device in the information transmission method according to the second aspect.

According to a tenth aspect, a communications system is provided, and includes the foregoing terminal device and network device.

DETAILED DESCRIPTION OF THE INVENTION

Figure 1:
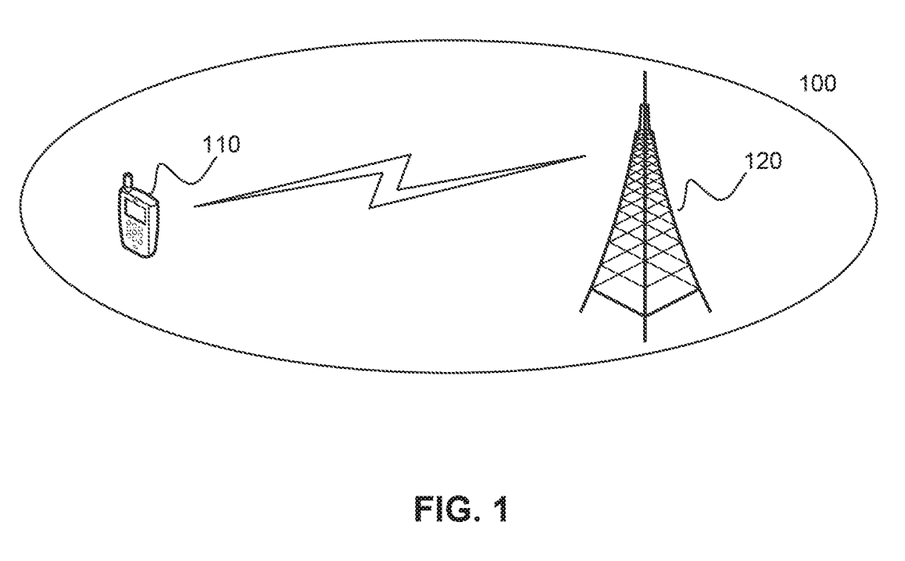
FIG. 1 is an example of an application scenario according to this application.

FIG. 1 is a schematic diagram of an application scenario according to an embodiment of this application.

As shown in FIG. 1, a communications system 100 may include a terminal device 110 and a network device 120. The network device 120 may communicate with the terminal device 110 through an air interface. Multi-service transmission between the terminal device 110 and the network device 120 is supported.

It should be understood that, the communications system 100 is merely used as an example to describe the embodiments of this application, but the embodiments of this application are not limited thereto. That is, the technical solutions of the embodiments of this application may be applied to various communications systems, for example, a long term evolution (LTE) system, an LTE time division duplex (TDD), a universal mobile telecommunication system (UMTS), and the like. For ease of description, a 5-Generation (5G) new radio (NR) communications system is used as an example to describe the embodiments of this application below.

The embodiments are described with reference to the terminal device and the network device in this application.

The network device 120 may refer to any entity on the network side used to send or receive signals. For example, the network device 120 may be user equipment of machine type communication (MTC), an evolved Node B (eNB or eNodeB) in LTE, a base station device in a 5G network, and the like.

In addition, the terminal device 110 may be any terminal device. Specifically, the terminal device 110 may communicate with one or more core networks by using a radio access network (RAN), and may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a 5G network.

In new radio (NR), a semi-persistent scheduling (SPS) timer is defined. Specifically, definitions are:

1. The timer is started when retransmission data/new transmission data is sent on the semi-persistent resources or dynamic resources scheduled based on a semi-persistent radio network temporary identifier (RNTI).

2. When the timer is running, if a user has semi-persistent resources at the current time, the user does not make any transmission.

3. When the timer is running, the timer is stopped or started after the user receives the dynamic resources scheduled based on the semi-persistent RNTI, and the timer is restarted based on the above 1.

However, the timer cannot be started or stopped or restarted with dynamic resources scheduled based on a cell radio network temporary identifier (C-RNTI), and is less compatible with the existing system framework.

Therefore, in the embodiments of this application, a timer management method is provided, to effectively improve compatibility between the SPS timer and the existing system framework.

Figure 2:
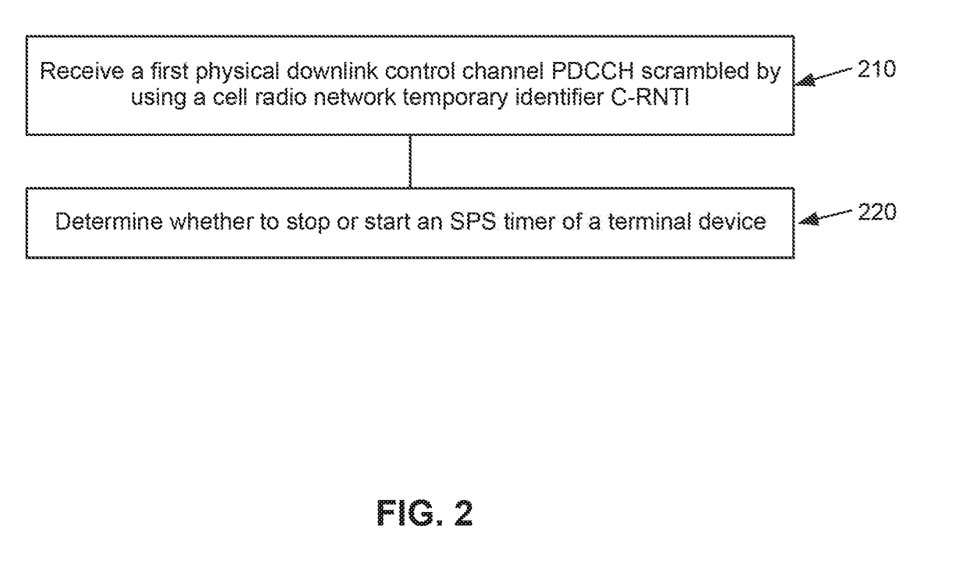
FIG. 2 is a schematic flowchart of a timer management method according to an embodiment of this application.

FIG. 2 is a schematic flowchart of a timer management method according to an embodiment of this application.

As shown in FIG. 2, the method includes:

210. A terminal device receives a first physical downlink control channel (PDCCH) scrambled by using a C-RNTI.

220. The terminal device determines whether to stop or start an SPS timer of the terminal device.

It should be understood that, in this embodiment of this application, after a network device is connected to the terminal device, the terminal device descrambles a PDCCH through a C-RNTI or an SPS-RNTI, to obtain scheduling information. The terminal device then determines a resource location of a physical downlink shared channel (PDSCH) according to the scheduling information, and obtains downlink data at the resource location of the PDSCH.

It should be further understood that, resources obtained after the terminal device descrambles the PDCCH through the C-RNTI to obtain scheduling information are dynamic scheduling resources, and resources obtained after the terminal device descrambles the PDCCH through the SPS-RNTI to obtain scheduling information may be semi-persistent scheduling SPS resources (for example, SPS resources after they are activated), or may be dynamic resources (for example, resources used for retransmission).

In the prior art, when the SPS timer is running, the timer is first stopped and then restarted after the terminal device receives the dynamic resources scheduled based on the semi-persistent scheduling. After the SPS timer receives dynamic resources scheduled based on a cell radio network temporary identifier (C-RNTI), there are no relevant regulations on the SPS timer.

In this embodiment of this application, after receiving the first PDCCH, the terminal device causes the SPS timer to be started or stopped or restarted with dynamic resources scheduled based on the C-RNTI, thereby effectively improving compatibility between the SPS timer and the existing system framework.

The following describes an implementation in which the SPS timer is stopped or started after the terminal device receives the first PDCCH.

In an embodiment, when meeting a preset condition, the terminal device determines to stop or start the SPS timer, the preset condition being a criterion for the terminal device to determine whether to stop or start the SPS timer after the terminal device obtains the first PDCCH.

The following describes an example of an implementation in which the SPS timer is stopped after the terminal device receives the first PDCCH.

Optionally, when meeting a first condition, the terminal device determines to stop the SPS timer, the first condition being a criterion for the terminal device to determine whether to stop the SPS timer after the terminal device obtains the first PDCCH.

For example, when determining that a hybrid automatic repeat request HARQ process corresponding to the first PDCCH sends uplink data by using resources scheduled by a PDCCH that is scrambled by an SPS RNTI before using resources scheduled by the first PDCCH, the terminal device stops the SPS timer.

For another example, when determining that a hybrid automatic repeat request HARQ process corresponding to the first PDCCH of the terminal device sends uplink data by using SPS resources before using resources scheduled by the first PDCCH, the terminal device stops the SPS timer.

For another example, when determining that the SPS timer is running, the terminal device stops the SPS timer.

It should be understood that, an implementation in which the SPS timer is running (that is, started) is not specifically limited in this embodiment of this application. For example, before determining whether to stop or start the SPS timer, the terminal device may send new data to the network device on the SPS resources, or retransmission data to the network device on resources scheduled by a second PDCCH that is scrambled by using an SPS radio network temporary identifier. Therefore, the terminal device starts the SPS timer.

The following describes an example of an implementation in which the SPS timer is started or restarted after the terminal device receives the first PDCCH.

Optionally, when meeting a second condition, the terminal device determines to start or restart the SPS timer, the second condition being a criterion for the terminal device to determine whether to start the SPS timer after the terminal device obtains the first PDCCH.

For example, when determining that the terminal device is configured with SPS resources, the terminal device starts or restarts the SPS timer.

Further, when determining that the terminal device is configured with SPS resources and the SPS resources are activated, the terminal device starts or restarts the SPS timer.

It should be understood that, the foregoing specific embodiments in which the terminal device determines to stop or start the SPS timer when the terminal device meets the preset condition are merely exemplary descriptions, and the embodiments of this application are not limited thereto.

In another embodiment, before determining whether to stop or start the SPS timer, the terminal device may receive configuration information sent by the network device, the configuration information being used to determine, by the terminal device, after obtaining the first PDCCH, whether to stop or start the SPS timer.

Therefore, the terminal device determines, according to the configuration information, whether to stop or start the SPS timer.

Figure 3:
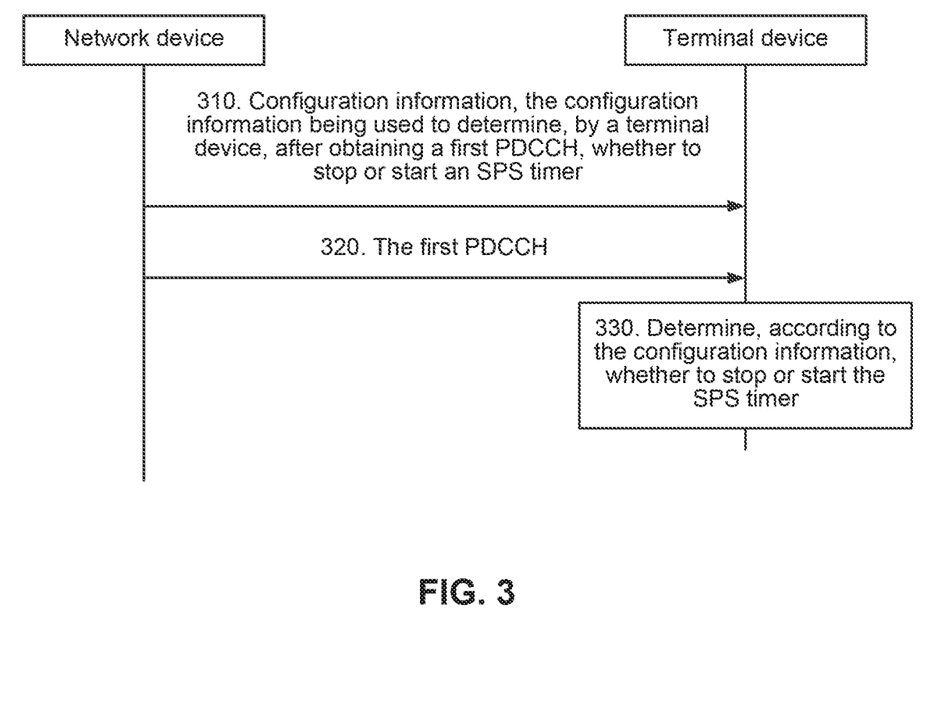
FIG. 3 is a schematic flowchart of an information transmission method according to an embodiment of this application.

FIG. 3 is a schematic flowchart of an information transmission method according to an embodiment of this application.

Specifically, as shown in FIG. 3, the method includes:

310. A network device sends configuration information to a terminal device, the configuration information being used to determine, by the terminal device, after obtaining a first PDCCH, whether to stop or start an SPS timer.

320. The network device sends the first PDCCH to the terminal device.

330. The terminal device determines, according to the configuration information, whether to stop or start the SPS timer.

Further, the terminal device receives radio resource control RRC signaling sent by the network device, the RRC signaling including the configuration information.

Figure 4:
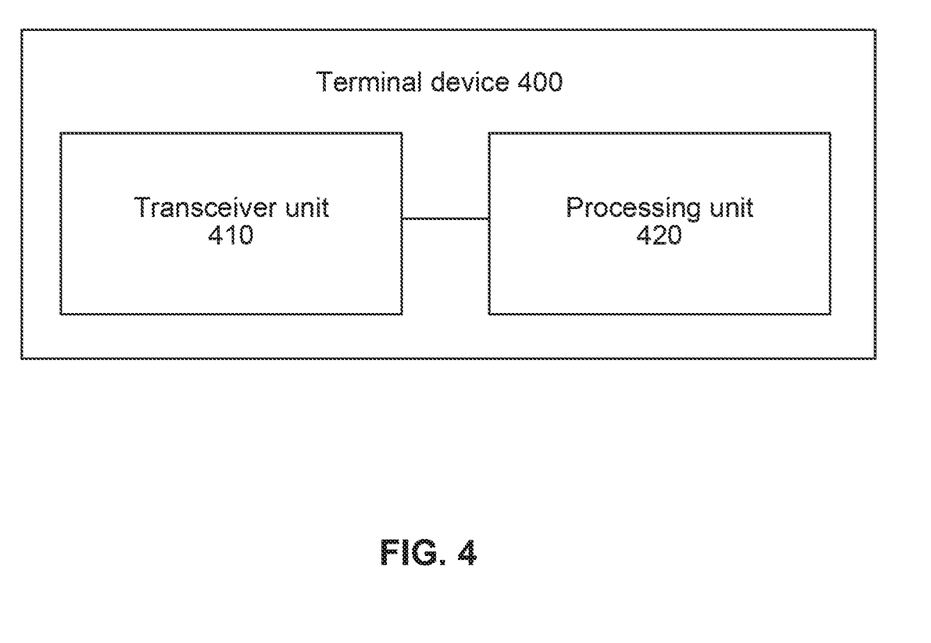
FIG. 4 is a schematic block diagram of a terminal device according to an embodiment of this application.

FIG. 4 is a schematic block diagram of a terminal device 400 according to an embodiment of this application. It should be understood that, the terminal device includes a semi-persistent scheduling SPS timer.

To be specific, as shown in FIG. 4, the terminal device 400 includes a transceiver unit 410, configured to receive a first physical downlink control channel PDCCH scrambled by using a cell radio network temporary identifier C-RNTI. The terminal device 400 further includes a processing unit 420, configured to determine whether to stop or start the SPS timer.

Optionally, the processing unit 420 is specifically configured to determine to stop the SPS timer when a first condition is met, the first condition being a criterion for the terminal device to determine whether to stop the SPS timer after the terminal device obtains the first PDCCH.

Optionally, the processing unit 420 is more specifically configured to stop, when determining that a hybrid automatic repeat request HARQ process corresponding to the first PDCCH sends uplink data by using resources scheduled by a PDCCH that is scrambled by an SPS RNTI before using resources scheduled by the first PDCCH, the SPS timer.

Optionally, the processing unit 420 is more specifically configured to stop, when determining that a hybrid automatic repeat request HARQ process corresponding to the first PDCCH of the terminal device sends uplink data by using SPS resources before using resources scheduled by the first PDCCH, the SPS timer.

Optionally, the processing unit 420 is more specifically configured to stop, when determining that the SPS timer is running, the SPS timer.

Optionally, the processing unit 420 is more specifically configured to determine to start or restart the SPS timer when a second condition is met, the second condition being a criterion for the terminal device to determine whether to start the SPS timer after the terminal device obtains the first PDCCH.

Optionally, the processing unit 420 is more specifically configured to start or restart the SPS timer when it is determined that the terminal device is configured with SPS resources.

Optionally, the processing unit 420 is more specifically configured to start or restart the SPS timer when it is determined that the terminal device is configured with SPS resources and the SPS resources are activated.

Optionally, the transceiver unit 410 is further configured to receive configuration information sent by a network device before whether to stop or start the SPS timer is determined, the configuration information being used to determine, by the terminal device, after obtaining the first PDCCH, whether to stop or start the SPS timer, where the processing unit 420 is more specifically configured to determine, according to the configuration information, whether to stop or start the SPS timer.

Optionally, the transceiver unit 410 is specifically configured to receive radio resource control RRC signaling sent by the network device, the RRC signaling including the configuration information.

Optionally, the transceiver unit 410 is further configured to send, before the processing unit 420 determines whether to stop or start the SPS timer, new data to the network device on the SPS resources, or retransmission data to the network device on resources scheduled by a second PDCCH that is scrambled by using an SPS radio network temporary identifier; and the processing unit 420 is further configured to start the SPS timer.

Figure 5:
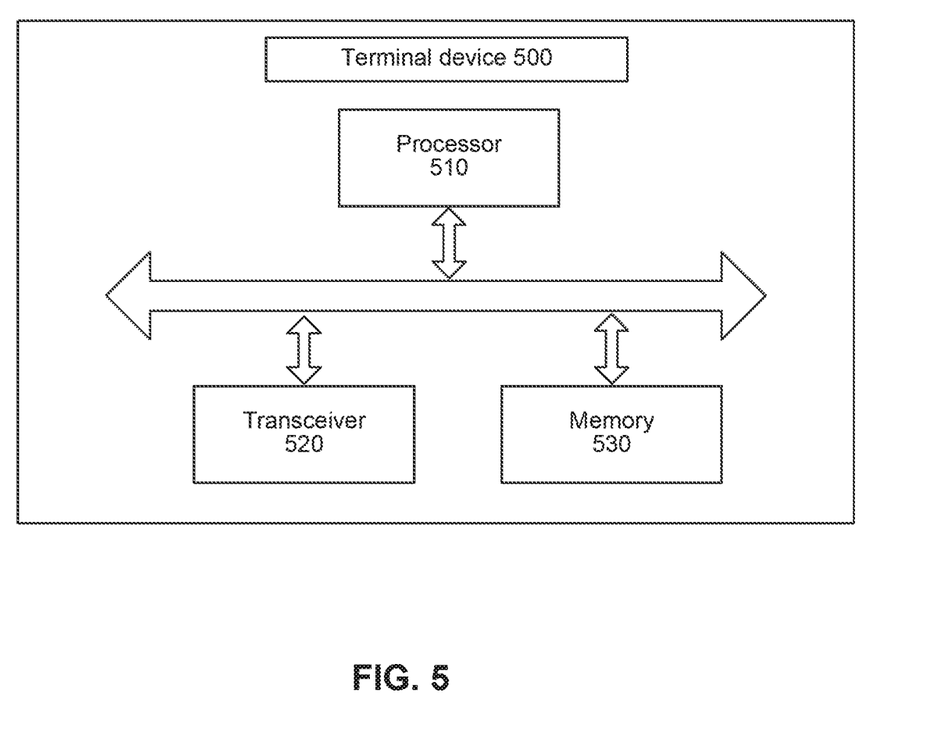
FIG. 5 is a schematic block diagram of another terminal device according to an embodiment of this application.

In this embodiment of this application, the transceiver unit 410 may be implemented by a transceiver, and the processing unit 420 may be implemented by a processor. As shown in FIG. 5, a terminal device 500 may include a processor 510, a transceiver 520, and a memory 530. The memory 530 may be configured to store indication information, and may be further configured to store code, instructions, and the like to be executed by the processor 510. Various components of the terminal device 500 are connected to each other by using a bus system. In addition to including a data bus, the bus system further includes a power bus, a control bus, and a status signal bus.

The terminal device 500 shown in FIG. 5 can implement various processes implemented by the terminal device in the method embodiment of FIG. 2. To avoid repetition, details are not described herein again. That is, the method embodiments in the embodiments of this application may be implemented by the processor and the transceiver.

Figure 6:
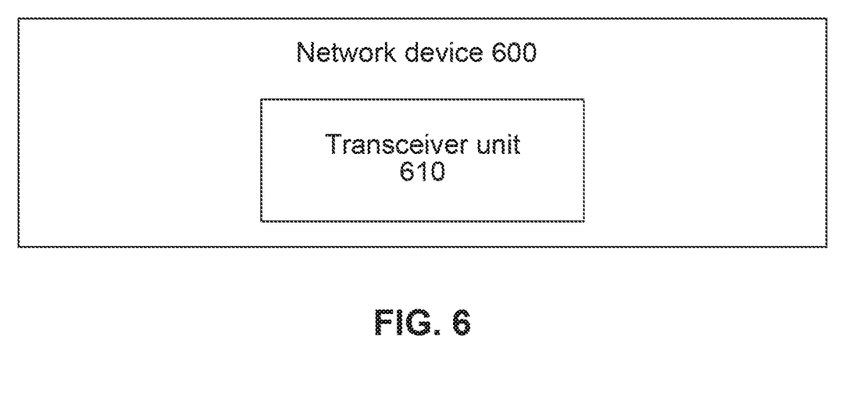
FIG. 6 is a schematic block diagram of a network device according to an embodiment of this application.

FIG. 6 is a schematic block diagram of a network device 600 according to an embodiment of this application.

To be specific, as shown in FIG. 6, the network device 600 includes a transceiver unit 610, configured to send a first physical downlink control channel PDCCH scrambled by using a cell radio network temporary identifier C-RNTI to a terminal device.

Optionally, the transceiver unit 610 is further configured to send, before sending the first physical downlink control channel PDCCH scrambled by using the cell radio network temporary identifier C-RNTI to the terminal device, configuration information to the terminal device, the configuration information being used to determine, by the terminal device, after obtaining resources indicated by the first PDCCH, whether to stop or start a semi-persistent scheduling SPS timer of the terminal device.

Optionally, the transceiver unit 610 is specifically configured to send radio resource control RRC signaling to the terminal device, the RRC signaling including the configuration information.

Optionally, the transceiver unit 610 is further configured to receive, before sending the first physical downlink control channel PDCCH scrambled by using the cell radio network temporary identifier C-RNTI to the terminal device, new data sent by the terminal device, on semi-persistent scheduling SPS resources, or retransmission data sent by the terminal device, on resources scheduled by the first PDCCH that is scrambled by using an SPS radio network temporary identifier.

Figure 7:
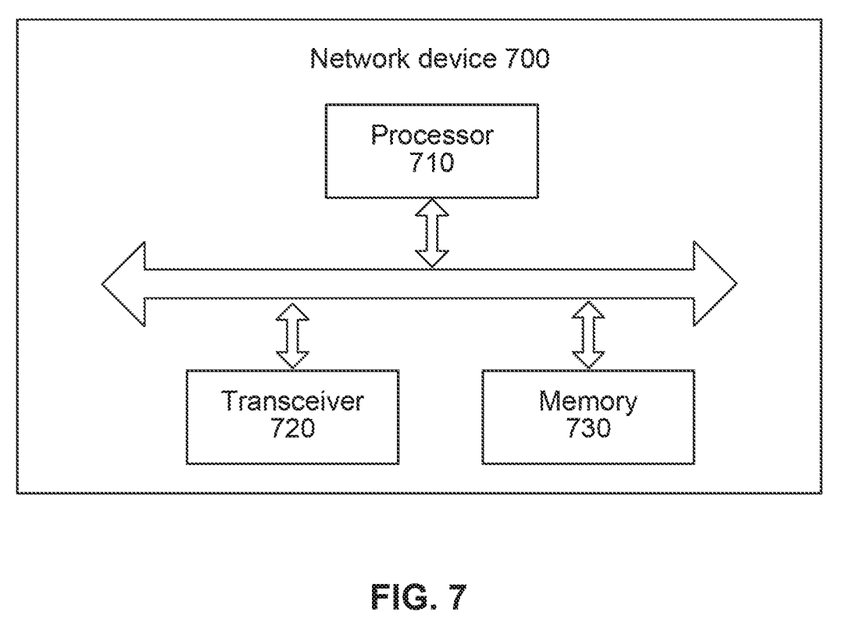
FIG. 7 is a schematic block diagram of another network device according to an embodiment of this application.

In this embodiment of this application, the transceiver unit 610 may be implemented by a transceiver. As shown in FIG. 7, a network device 700 may include a processor 710, a transceiver 720, and a memory 730. The memory 730 may be configured to store indication information, and may be further configured to store code, instructions, and the like to be executed by the processor 710. Various components of the network device 700 are connected to each other by using a bus system. In addition to including a data bus, the bus system further includes a power bus, a control bus, and a status signal bus.

The network device 700 shown in FIG. 7 can implement various processes implemented by the network device in the method embodiment of FIG. 2. To avoid repetition, details are not described herein again. That is, the method embodiments in the embodiments of this application may be implemented by the processor and the transceiver.

During implementation, the steps of the method embodiment of the embodiments of this application may be implemented by using a hardware integrated logic circuit in the processor or implemented by using an instruction in a software form. More specifically, steps of the methods disclosed with reference to the embodiments of this application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It should be understood that, the processor in the embodiments of this application may be an integrated circuit chip, has a signal processing capability, and can implement or perform various methods, steps, and logical block diagrams disclosed in the embodiments of this application. For example, the foregoing processor may be a general purpose processor, a digital signal processor (DSP), an application-specific integrated circuit (ASIC), a field programmable gate array (FPGA), or another programmable logical device, or transistor logical device, or discrete hardware component. Moreover, the general purpose processor may be a microprocessor or the processor may be any conventional processor and the like.

In addition, it may be understood that the memory mentioned in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. It should be understood that, the foregoing memory is described as an example other than a limitation. For example, the memory in this embodiment of this application may be further a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. That is, the memory of the systems and methods described in this specification includes but is not limited to those and any memory of another proper type.

Finally, it should be noted that, the terms used in the embodiments and the appended claims of this application are merely for describing specific embodiments, but are not intended to limit the embodiments of this application.

For example, the terms "a", "said", "foregoing" and "the" of singular forms used in the embodiments and the appended claims of this application are also intended to include plural forms, unless otherwise specified in the context clearly.

For another example, depending on the context, for example, words "when" used herein may be explained as "if" or "on condition that" or "while" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the embodiments of this application.

In addition, functional units in the embodiments of this application may be integrated into one processing unit, or each of the units may exist alone physically, or two or more units are integrated into one unit.

When the functional units are implemented in a form of a software functional module and sold or used as an independent product, the functional units may be stored in a computer-readable storage medium. Based on such an understanding, the technical solutions of the embodiments of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiments of this application. The foregoing storage medium includes: any medium that can store program codes, such as a USB flash disk, a removable hard disk, a read-only memory, a random access memory, a magnetic disk, or an optical disk.

The foregoing content is merely specific implementations of the embodiments of this application, but is not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A method of timer management in a communication network, comprising:
   obtaining, by a device of the communication network, a first physical downlink control channel (PDCCH); and
   determining, by the device of the communication network, whether to, start or restart a timer, when the first PDCCH is scrambled by using a cell radio network temporary identifier (C-RNTI),
   wherein the timer is a semi-persistent scheduling (SPS) timer,
   wherein determining whether to start or restart the SPS timer comprises determining, by the device of the communication network, when meeting a first condition, to stop, start or restart the timer, the first condition being a criterion for the device of the communication network to determine whether to stop the timer after the device of the communication network obtains the first PDCCH, and
   wherein determining, by the device of the communication network, when meeting a first condition, to stop the timer comprises stopping, by the device of the communication network, the timer when determining that a hybrid automatic repeat request (HARQ) process corresponding to the first PDCCH sends uplink data by using resources scheduled by a PDCCH that is scrambled by an SPS RNTI before using resources scheduled by the first PDCCH.

2. The method according to claim 1, wherein the determining whether to start or restart the timer comprises:
   determining, by the device of the communication network, when meeting a second condition, to start or restart the timer, the second condition being a criterion for the device of the communication network to determine whether to start the timer.

3. The method of claim 2, wherein determining, by the device of the communication network, when meeting a second condition, to start or restart the timer comprises:
   starting or restarting, by the device of the communication network, the timer when determining that the device of the communication network is configured with SPS resources.

4. The method of claim 2, wherein starting or restarting, by the device of the communication network, the timer when determining that the device is configured with SPS resources comprises:
   starting or restarting, by the device of the communication network, the timer when determining that the device of the communication network is configured with SPS resources and the SPS resources are activated.

5. The method of claim 1, further comprising:
   receiving, by the device of the communication network, configuration information, after obtaining the first PDCCH, whether to stop or start the SPS timer.

6. The method of claim 5, wherein receiving configuration information comprises:
   receiving, by the device of the communication network, radio resource control (RRC) signaling sent by a network device, the RRC signaling comprising the configuration information.

7. The method according to claim 1, further comprising:
   sending, by the device of the communication network, new data on SPS resources, or retransmission data to a network device on resources scheduled by a second PDCCH that is (i) received by the device subsequent to the first PDCCH and (ii) scrambled by using an SPS radio network temporary identifier; and
   starting, by the device of the communication network, the timer.

8. A communication device of a communication network, comprising:
   a processor and a memory storing program instructions, wherein when the program instructions are executed by the processor, the communication device is configured to:
      obtain a first physical downlink control channel (PDCCH); and
      determine whether to start or restart a timer, when the first PDCCH is scrambled by using a cell radio network temporary identifier (C-RNTI),
      wherein the timer is a semi-persistent scheduling (SPS) timer,
      wherein determining whether to start or restart the SPS timer comprises determining, when meeting a first condition, to stop, start or restart the timer, the first condition being a criterion for the device of the communication network to determine whether to stop the timer after obtaining the first PDCCH, and
      wherein determining, when meeting a first condition, to stop the timer comprises stopping the timer when determining that a hybrid automatic repeat request (HARQ) process corresponding to the first PDCCH sends uplink data by using resources scheduled by a PDCCH that is scrambled by an SPS RNTI before using resources scheduled by the first PDCCH.

9. The communication device of claim 8, wherein the determining whether to start or restart the timer comprises:
   determining when meeting a second condition, to start or restart the timer, the second condition being a criterion for the device to determine whether to start the timer.

10. The communication device of claim 8, wherein determining, when meeting a second condition, to start or restart the timer comprises:
    starting or restarting the timer when determining that the device of the communication network is configured with SPS resources.

11. The communication device of claim 10, wherein starting or restarting, by the device of the communication network, the timer when determining that the device is configured with SPS resources comprises:
    starting or restarting the timer when determining that the device of the communication network is configured with SPS resources and the SPS resources are activated.

12. The communication device of claim 10, wherein when the program instructions are executed by the processor, the communication device is further configured to:

receive configuration information, after obtaining the first PDCCH, whether to stop or start the SPS timer.

13. The communication device of claim 12, wherein receiving configuration information comprises:
receiving radio resource control (RRC) signaling sent by a network device, the RRC signaling comprising the configuration information.

14. The communication device of claim 10, wherein when the program instructions are executed by the processor, the communication device is further configured to:
send new data on SPS resources, or retransmission data to a network device on resources scheduled by a second PDCCH that is (i) received by the device subsequent to the first PDCCH and (ii) scrambled by using an SPS radio network temporary identifier; and
start the timer.

15. A non-transitory computer-readable storage medium storing computer-executable program instructions that, when executed by a processing device, cause the processing device to perform operations comprising:
obtaining, by a device of a communication network, a first physical downlink control channel (PDCCH); and
determining whether to start or restart a timer, when the first PDCCH is scrambled by using a cell radio network temporary identifier (C-RNTI),
wherein the timer is a semi-persistent scheduling (SPS) timer,
wherein determining whether to start or restart the SPS timer comprises determining when meeting a first condition, to stop, start or restart the timer, the first condition being a criterion for the device of the communication network to determine whether to stop the timer after the device obtains the first PDCCH, and
wherein determining when meeting a first condition, to stop the timer comprises stopping the timer when determining that a hybrid automatic repeat request (HARQ) process corresponding to the first PDCCH sends uplink data by using resources scheduled by a PDCCH that is scrambled by an SPS RNTI before using resources scheduled by the first PDCCH.

16. The non-transitory computer-readable storage medium of claim 15, wherein the determining whether to start or restart the timer comprises:
determining when meeting a second condition, to start or restart the timer, the second condition being a criterion for the device of the communication network to determine whether to start the timer.

17. The non-transitory computer-readable storage medium of claim 15, wherein determining when meeting a second condition, to start or restart the timer comprises:
starting or restarting the timer when determining that the device of the communication network is configured with SPS resources.

18. The non-transitory computer-readable storage medium of claim 15, wherein starting or restarting the timer when determining that the device is configured with SPS resources comprises:
starting or restarting the timer when determining that the device of the communication network is configured with SPS resources and the SPS resources are activated.

19. The non-transitory computer-readable storage medium of claim 15, wherein when executed by the processing device, the computer-executable program instructions cause the processing device to perform operations comprising:
receiving configuration information, after obtaining the first PDCCH, whether to stop or start the SPS timer.

20. The non-transitory computer-readable storage medium of claim 19, wherein receiving configuration information comprises:
receiving radio resource control (RRC) signaling sent by a network device, the RRC signaling comprising the configuration information.

* * * * *